United States Patent Office 3,822,319
Patented July 2, 1974

3,822,319
4-METHOXYPHENYL ETHER OF
4-m-TOLYL-1-PENTANOL
Carl T. Redemann, Walnut Creek, Calif., assignor to
The Dow Chemical Company, Midland, Mich.
No Drawing. Filed Dec. 7, 1972, Ser. No. 313,156
Int. Cl. C07c 43/20
U.S. Cl. 260—613 R                       1 Claim

ABSTRACT OF THE DISCLOSURE

The invention is the 4-methoxyphenyl ether of 4-m-tolyl-1-pentanol. It has been found useful in controlling the insect pest *Heliothis obsoleta* by interfering with the laying of viable eggs.

SUMMARY OF THE INVENTION

The invention is the 4-methoxyphenyl ether of 4-m-tolyl-1-pentanol. It has been found useful in controlling the insect *Heliothis obsoleta*.

The compound was prepared by first preparing 4-m-tolyl-1-pentanol. Ninety-seven grams (0.725 m.) of technical anhydrous $AlCl_3$ was suspended in 1,060 ml. (10 m.) of toluene, to which was added, dropwise with stirring, 43 g. (0.5 m.) of tetrahydro-2-methylfuran at such a rate that the solution temperature held between 30 and 35° C. The reaction mixture was permitted to stir at ambient temperature for three more hours, poured onto 500 g. of crushed ice, and separated from the resulting aqueous phase.

The toluene phase was then washed with two successive 200 ml. portions of water, and the water washes combined and extracted with 100 ml. of toluene. Evaporation yielded 79.5 g. of amber oil, which, upon distillation, yielded 68 g. of distillate (76–78° C. at 0.1 mm.).

39.2 grams (0.22 m.) of the resulting 4-m-tolyl-1-pentanol was then added to a solution of 70 g. of 48% HBr and 12 cc. of conc. $H_2SO_4$ in a 250 ml. flask fitted with a magnetic stirrer. The whole was heated under reflux for 1.5 hours and then permitted to cool to room temperature. 75 ml. of $H_2O$ was added and the resulting mixture shaken. Phases were separated and the organic layer then washed with 25 ml. of $H_2O$ containing enough 1 N NaOH to adjust the pH of the aqueous phase to 7. The nonaqueous phase was separated and distilled (102°–104° C. at 0.10 mm.) to obtain 46 g. of m-(4-bromo-1-methylbutyl) toluene, the structure of which was confirmed by analysis.

To 40 ml. of a mixture of equal volume of hexamethylphosphoramide and monoglyme was added 2.1 g. (0.375 m.) of powdered KOH, 6.03 g. (0.025 m. (of m-(4-bromo-1-methylbutyl) toluene, the structure of which was confirmed by analysis.

To 40 ml. of a mixture of equal volumes of hexamethylphosphoramide and monoglyme was added 2.1 g. (0.375 m.) of powdered KOH, 6.03 g. (0.025 m.) of m-(4-bromo-1-methylbutyl) toluene and 0.031 m. of p-methoxyphenol. The whole was stirred at room temperature for 72 hours, and then worked-up by pouring into 50 ml. of $H_2O$, extracting into hexane and separating by chromatographic techniques. 6.8 g. were recovered, analysis confirming the structure of the desired ether.

In order to demonstrate the activity of the claimed compound, second instar larvae of *Heliothis obsoleta* supported on an artificial diet were sprayed with an emulsion of the claimed compound at an application rate of 2 pounds per acre of active material. The larvae were maintained until maturity on the sprayed diet and then permitted to mate. Egg-laying decreased to less than one-half the control rate, and less than 7 percent of the eggs laid were viable.

I claim:
1. The 4-methoxyphenol ether of 4-m-tolyl-1-pentanol.

References Cited

Baddeley et al.: Chem. Abstract, 58, 10051b (1963).

BERNARD HELFIN, Primary Examiner

N. CHAN, Assistant Examiner

U.S. Cl. X.R.
424—341